UNITED STATES PATENT OFFICE.

JOHN HAGENBACH, OF BASLE, SWITZERLAND, ASSIGNOR TO ANILINE COLOUR AND EXTRACT WORKS, FORMERLY JOHN R. GEIGY, OF BASLE, SWITZERLAND.

RED AZO DYE AND PROCESS OF MAKING SAME.

No. 808,919.            Specification of Letters Patent.            Patented Jan. 2, 1906.

Application filed June 29, 1905. Serial No. 267,676. (Specimens.)

*To all whom it may concern:*

Be it known that I, JOHN HAGENBACH, Ph. D., a citizen of the Swiss Republic, residing at Basle, Switzerland, have invented certain new and useful Improvements in Red Azo Dyestuffs and Processes of Making the Same, of which the following is a specification.

Of 1.0 derivatives from amidonaphthols only the diazo compound of the 2-amido-3-naphthol-6-sulfonic acid has been coupled until now with 1-phenyl-5-pyrazolones which are not substituted in position four, (German Patent No. 134,162.)

Now I have found that the diazo bodies of the 1-2 and 2-1-amidonaphthol sulfonic acids which according to the process described in the application for United States Letters Patent, Serial No. 226,619, filed September 30, 1904, can be produced in a technical way more easily than the 2-diazo-3-naphthol-6-sulfonic acid, combine very promptly with the above-mentioned 1-phenyl-5-pyrazolones yielding very valuable dyestuffs. The new coloring-matters thus obtained are dark-brown powders with slight metallic luster, soluble in water with an orange-yellow to reddish-brown color, turning into yellowish red to bluish red by adding acetic acid. In concentrated sulfuric acid they dissolve with a bright-orange to red color and distinguish themselves from the coloring-matters of the 2-diazo-3-naphthol-6-sulfonic acid whose dyeings on wool treated with potassium bichromate, giving only brown-red shades, in the most advantageous way by the bright yellowish-red to bluish-red tints of their dyeings treated with a chromium compound.

In carrying out my process practically I can proceed as follows, the parts being by weight: twenty-five parts of powdered and dried diazo compound from 1-amido-2-naphthol-4-sulfonic acid are slowly introduced while stirring into a solution of eighteen parts of 1-phenyl-3-methyl-5-pyrazolone in about five hundred parts of water, twelve parts of caustic-soda lye, (40° Baumé,) and fifteen parts of sodium carbonate. After a few hours the combination is accomplished. The coloring-matter is then precipitated by the addition of common salt filtered off and dried. It forms a dark-brown shiny powder and dissolves in water with an orange-yellow color, which upon addition of acetic acid changes into a brilliant red. In concentrated sulfuric acid it dissolves with magenta color. If the coloring is precipitated from the alkaline solution by addition of a small surplus of an acid instead of common salt, it is obtained in the form of a bright-red crystalline powder.

The new coloring-matter dyes wool from acid-bath reddish-brown yellow, which shade by subsequent treatment with a chromium compound changes to crimson-red, distinguished for great fastness to the action of light and the processes of milling and potting.

The process proceeds in an analogous manner if other diazonaphtholsulfonic acids or if other phenylpyrazolones are used.

In the following small table I give the shades of the dyeings on wool of some more of the new dyestuffs from an acid-bath and after treatment with potassium bichromate.

| Dyestuff produced by combination of diazotized. | With— | Dyes wool from acid-bath. | After treatment with potassium bichromate. |
|---|---|---|---|
| 1-amido-2-naphthol-6-sulfonic acid. | 1-phenyl-3-methyl-5-pyrazolone. | Yellowish brown. | Brownish-yellow red. |
| 1-amido-2-naphthol-7-sulfonic acid. | | Yellowish brown. | Yellowish-blue red. |
| 1-amido-2-naphthol-3-6-disulfonic acid. | | Reddish brown. | Blue-red. |
| 1-amido-2-naphthol-4-6-disulfonic acid. | | Reddish-yellow brown | Yellowish-blue red. |
| 2-amido-1-naphthol-4-sulfonic acid. | | Violet-brown. | Yellowish red. |
| 2-amido-1-naphthol-5-sulfonic acid. | | Yellowish-red brown. | Blue-red. |
| 2-amido-1-naphthol-3-6-disulfonic acid. | | Violet-brown. | Yellowish red. |
| 2-amido-1-naphthol-4-8-disulfonic acid. | | Reddish yellow. | Brownish-blue red. |

Having now described my invention, what I claim is—

1. The process for producing red azo dyestuffs by combining the diazo derivatives of ortho amidonaphthol sulfonic acids with 1-phenyl-5-pyrazolones capable to combine in position four, substantially as set forth.

2. The process for producing a red azo dyestuff by combining the diazo derivative of 1-amido-2-naphtol-4-sulfonic acid with 1-phenyl-3-methyl-5-pyrazolone substantially as set forth.

3. The herein-described new azo dyestuffs produced by combining the diazo derivatives of ortho amidonaphthol sulfonic acids with 1-phenyl-5-pyrazolones capable to combine in position four, forming dark-brown powders with slight metallic luster, soluble in water with an orange-yellow to reddish-brown color, turning into yellowish red to bluish red by addition of acetic acid, soluble in concentrated sulfuric acid with a bright orange to red color and yielding on wool from acid-bath yellowish-brown to violet-brown shades, changing into yellowish red to bluish red when treated after dyeing with chromium compounds substantially as set forth.

4. The herein-described new azo dyestuffs produced by combining the diazo derivative from 1-amido-2-naphthol-4-sulfonic acid with 1-phenyl-3-methyl-5-pyrazolone, forming a dark-brown shiny powder, soluble in water with an orange-yellow color, turning into a brilliant red by addition of acetic acid, soluble in concentrated sulfuric acid with magenta color and yielding on wool from acid-bath reddish-brown-yellow shades changing into crimson-red when treated after dyeing with chromium compounds substantially as set forth.

In testimony whereof I have signed this specification in the presence of two subscribing witnesses.

JOHN HAGENBACH.

Witnesses:
　ALB. GRASTE,
　GEO. GIFFORD.